United States Patent [19]

Fidei et al.

[11] 4,254,352

[45] Mar. 3, 1981

[54] PARALLEL RING AND RING EXTENSION SUPPORT SYSTEM FOR DYNAMOELECTRIC MACHINES

[75] Inventors: Frank P. Fidei, Forest Hills Boro; Michael Saviski, White Oak Boro; Andrew J. Jarabak, Murrysville Boro, all of Pa.

[73] Assignee: Westinghouse Electric Corp., Pittsburgh, Pa.

[21] Appl. No.: 16,244

[22] Filed: Feb. 28, 1979

[51] Int. Cl.$^3$ .............................................. H02K 11/00

[52] U.S. Cl. ......................................... 310/71; 310/91; 310/260

[58] Field of Search ..................... 310/71, 260, 91, 66, 310/198, 180, 184; 248/67.5, 68 CB; 336/192

[56] References Cited

U.S. PATENT DOCUMENTS

| | | | |
|---|---|---|---|
| 2,683,227 | 7/1954 | Beckwith | 310/71 |
| 2,728,002 | 12/1955 | Turner | 310/71 |
| 2,742,582 | 4/1956 | Bahn | 310/71 |
| 3,531,071 | 9/1970 | Kubli | 248/68 CB |
| 3,903,441 | 9/1975 | Towne | 310/71 |
| 4,029,978 | 6/1977 | Jager | 310/71 |
| 4,140,934 | 2/1979 | Jager | 310/71 |

*Primary Examiner*—R. Skudy
*Attorney, Agent, or Firm*—G. H. Telfer

[57] ABSTRACT

A dynamoelectric machine having a casing structure which includes a thin cylindrical member, circumferentially separated axial gussets attached to the cyclindrical member's interior, at least two axial rows of arcuate structural segments connected between the axial gussets, a cylindrical stator core, and a stator winding distributed on the stator core and having phase terminals. Conductor rings and ring extensions protruding therefrom are supported within the casing structure at one axial end thereof by conductor ring clamp systems and ring extension clamp structures respectively. Circumferential positions of the ring extensions correspond to the circumferential positions of the phase terminals. Phase leads which electrically connect the phase terminals and the ring extensions have standard lengths. the number of phase lead standard lengths equal the number of different radial distances the phase terminals are displaced from the stator core's axis. Attaching the conductor ring clamping systems to the arcuate structural segments permits clamping system disposition at the circumferential positions corresponding to the ring extensions' positions. The ring extension clamp structures connect to the conductor ring clamp systems and provide optimum rigidity to the ring extensions. The conductor ring clamp systems each include two blocks which each have indentations in one edge. The indentations on one block are juxtaposable with the indentations on the other block so as to cooperatively provide openings for the reception and retention of the conductor rings. The ring extension clamp structures are similarly configured, but usually have only one indentation in each block for receiving and retaining the ring extension.

7 Claims, 5 Drawing Figures

40c
40b
40a
64
40
62
28
40c
38d
38c
56
58
54
24c
38
38b
38c
38a
60
36
36

46
24e
52
24d
50
40'
24c
42
28
24b
38'
52
24a
50
42
24
44
48
32

PARALLEL RING AND RING EXTENSION SUPPORT SYSTEM FOR DYNAMOELECTRIC MACHINES

BACKGROUND OF THE INVENTION

1. Field of the Invention

This invention relates to parallel rings, ring extensions, and phase leads connected thereto, and more particularly, to means for supporting the parallel rings and ring extensions.

2. Description of the Prior Art

Stator windings on large dynamoelectric machines such as turbine generators are disposed on generally cylindrical stator cores. The stator winding on multiphase generators includes a plurality of phase zones each of which constitute a plurality of coil sides. All the coil sides in each phase zone except those constituting the terminal coil side portions are serially connected at each axial end of the stator core. The unconnected ends of the terminal coil sides constitute terminals which are radially separated from the stator core's axis by discrete radial distances at a first axial end of the stator core.

Parallel conductor ring structures are disposed at the first axial end of the stator core and include a plurality of parallel rings and ring extensions connected thereto at selected circumferential locations. The rings are circumferentially situated about the stator core and the ring extensions protrude generally radially inwardly and axially toward the first end.

The stator and parallel ring structures are enclosed in a casing structure which includes a cylindrical, thin-walled member which has axial gussets connected thereto on the radially inner side. Use of axial gussets with a cylindrical member permits use of a thin-walled member rather than a thick-walled member and thus provides economic advantages thereover.

The parallel rings and ring extensions were supported by a bracing structure at the axial gussets due to the relatively high rigidity and structural support provided by the gussets as compared to the cylindrical members.

Phase leads connect the coil terminals to the appropriate parallel ring extensions. While the circumferential locations for the ring extensions were chosen to correspond to the axial gusset nearest the connected coil terminal, the circumferential locations of the terminals and associated phase leads were dictated by the number of phases, stator winding technique, and the stator's cooling paths. Since the circumferential locations of the coil terminals were seldom the same as the circumferential locations of the ring extensions, the phase leads connecting the terminals and ring extensions were of several lengths necessitating the custom design and manufacture of the phase leads on each machine. As such, each phase lead length required dynamic testing to avoid operational resonance and ensure adequate support therefor.

The bracing structure for the parallel rings must be capable of withstanding forces of up to 1500 pounds per inch for two-pole generators and 2000 pounds per inch for four-pole generators during sudden short circuits between parallel rings in addition to radial forces due to these shorts. Additionally, the bracing system must be capable of supporting its own weight as well as steady state forces in the axial and radial directions. The parallel rings have, heretofore, been clamped between epoxy laminate glass blocks which are custom made for each machine and bracing location. The glass blocks are mounted axially between the parallel rings and are used as spacers on both axial extremes thereof to provide the desired spacing. The spacing, clamping blocks and separated parallel rings were disposed axially between a stopping structure and a bolt-washer assembly and radially against the axial gussets. The bolt-washer assemblies enable selected axial clamping pressures to be applied to the separated parallel rings. However, support against radial forces exerted on the parallel rings and their weight was provided only from friction between the glass epoxy blocks and the parallel ring's external insulation material. Since friction alone was relied upon to provide the radial support necessary to prevent radial motion of the parallel rings, any radial displacement of the rings provided a possibility of abrasion and wear of the parallel ring's insulation and spacing blocks.

Each ring extension's axial traversal of the circumferentially disposed parallel rings facilitated the mechanical interconnection of each ring extension with the adjacent parallel rings so as to stiffen the ring extension. However, since the parallel rings were not positively restrained in the radial direction, the ring extensions, likewise, were not secured in the radial direction.

The lack of positive radial bracing of the parallel rings and ring extensions can reduce the reliability of the utilizing machine. The custom designed phase leads on each machine resulted in higher engineering, manufacturing, and assembly cost and relatively low availability of replacement phase leads for maintenance and/or refurbishment.

SUMMARY OF THE INVENTION

In general a dynamoelectric machine made in accordance with the present invention includes a cylindrical stator core, a stator core distributed winding having a plurality of phase terminals located at a plurality of discrete radial distances from the stator core's axis, a casing structure surrounding the stator core, a plurality of conductor ring structures including conductor rings and ring extensions, a plurality of phase lead groups each of which include a plurality of phase leads for electrically connecting the phase terminals and the ring extensions wherein the phase leads of each group are of equal length and the number of groups is equal to the number of discrete radial terminal distances, a plurality of conductor ring clamp systems connected to said casing structure for supporting the conductor rings at selected circumferential locations, and a plurality of ring extension clamp structures associated with said clamping systems for supporting the ring extensions.

The casing structure includes a relatively thin cylindrical member and a plurality of axial gussets attached to the radially inner side thereof. A plurality of arcuate structural segments are connected to the axial gussets and are disposed in at least two axial rows. The arcuate structural segments provide support for the conductor ring clamp systems and the ring extension clamp structures at the circumferential locations which correspond to the use of standardized length phase leads. The number of standardized phase lead lengths is equal to the number of different discrete radial distances the phase terminals are separated from the stator core axis.

The conductor ring clamp systems constitute a plurality of arcuately separated insulated support blocks each of which have a plurality of indentations in one edge, means for attaching the support blocks to the casing structure, a plurality of insulated clamping blocks each of which have a plurality of indentations in one edge, means for displacing the intended edges of the clamping blocks relative to the indented edges of the support blocks so as to provide compression of the conductor rings each of which is partially disposed in one of the clamping block's indentations and one of the support block's indentations.

Each of the ring extension clamp structures includes an insulated bolster block which extends between circumferentially adjacent clamping blocks and has at least one indentation in one edge thereof, means for attaching the bolster block to the circumferentially adjacent clamping blocks, an insulated retaining block having an indentation in one edge wherein the retaining block's indentation is juxtaposable with the bolster block's indentation, and means for relatively displacing the indented edges of the retaining block and the bolster block to provide compression of the ring extension which is partially disposed in each indentation.

Electrical connections between the ring extensions and phase leads are axially beyond the parallel rings, necessitating axial traversal of the rings by the ring extensions. Two or more ring extension clamp structures may be utilized on ring extensions of substantial length. Most frequently, multiple ring extension clamp structures are needed for ring extensions which extend from the parallel rings most axially distantly removed from the phase leads.

The ring clamp systems and ring extension clamp structures provide a positive retention in the axial and radial directions for the parallel rings and ring extensions, respectively. The conductor ring clamp systems and the ring extension clamp structures are disposable at selected circumferential positions along the arcuate structural segments corresponding to the phase terminals and permitting the use of standardized lengths. Such phase leads are designed to have natural frequencies higher than the utilizing machine's forcing frequency. The cost of manufacture of such phase leads is lower and the reliability is higher. Additionally, axial gussets used to reinforce the relatively thin-walled cylinder may be reduced in size due to the strengthening effect provided by the arcuate structural segments connected between the axial gussets.

BRIEF DESCRIPTION OF THE DRAWINGS

The objects and advantages of this invention will become more apparent from reading the following detail description in connection with the accompanying drawings, in which.

DESCRIPTION OF THE PREFERRED EMBODIMENT

Figure 1:
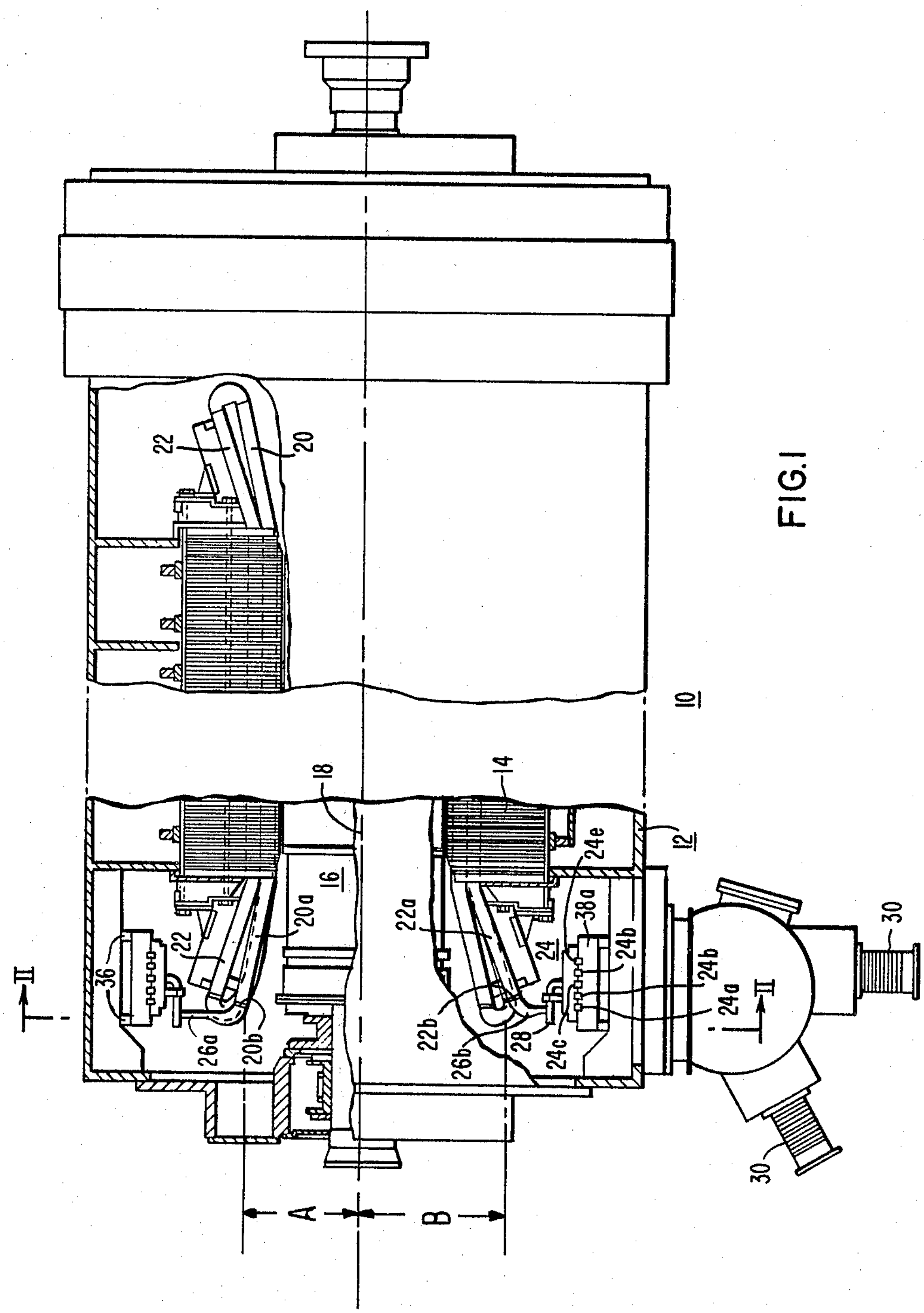
FIG. 1 is a partial, transverse sectional view of a turbine generator made in accordance with the present invention.

Referring now to the drawings in detail, FIG. 1 is a partial transverse sectional view of a turbine generator 10 having a casing structure 12 which houses laminated stator core 14 and rotatable rotor 16. Stator core 14 is a cylindrical structure disposed about axis 18 which is coincidental with the rotatable axis of rotor 16. Axial slots on the radially inner periphery of stator core 14 are provided for the reception of a stator winding. The stator winding includes a plurality of interconnected coils which are formed by electrically connecting a suitable number of half coils or coil sides 20 and 22 which are respectively disposed in different axial slots and are connected in the axial end regions of generator 10. Coil sides 20 and 22 are respectively disposed in the radially inner and radially outer portions of different axial slots. The stator winding illustrated in FIG. 1 has two coil sides disposed in each axial slot, but it is to be understood that any number of coil sides may be disposed in each axially extending slot with each of those coil sides being interconnectable with coil sides disposed in other slots which are circumferentially displaced therefrom. Each stator coil includes two coil terminating sides **20*a* and 22*a* respectively disposed in a radially inner or top portion of a slot and the radially outer or bottom portion of the slot. The ends of coil sides 20*a* and 22*a* respectively constitute electrical phase terminals 20*b* and 22*b* which are respectively disposed at radial distances A and B from stator core 14's radial center line 18. A set of parallel conductor ring structures 24 are circumferentially disposed about stator core 14 at one axial end thereof. The five illustrated conductor ring structures 24, respectively, include parallel conductor rings 24*a*, 24*b*, 24*c*, 24*d*, and 24*e* which are each electrically connected to a separate phase terminal 20*b* or 22*b* by phase leads 26*a* and 26*b*, respectively. Each of the parallel conductor ring structures 24 also includes a ring extension 28 which passes axially and radially relative to the conductor rings. Phase leads 26*a* and 26*b* are electrically connected to the conductor rings by the conductor ring extensions 28. Each of the conductor rings 24*a* through 24*e* are electrically connected to bushings 30 which constitute external electrical connections for the illustrated generator 10. Five parallel conductor ring structures are illustrated in FIG. 1** at the utilized sectioning plane. However, the number of axially adjacent parallel conductor rings actually varies in the circumferential direction according to the number of phases, the series or parallel character of the stator winding, and the split or full character of the stator winding's phase zones.

Figure 2:
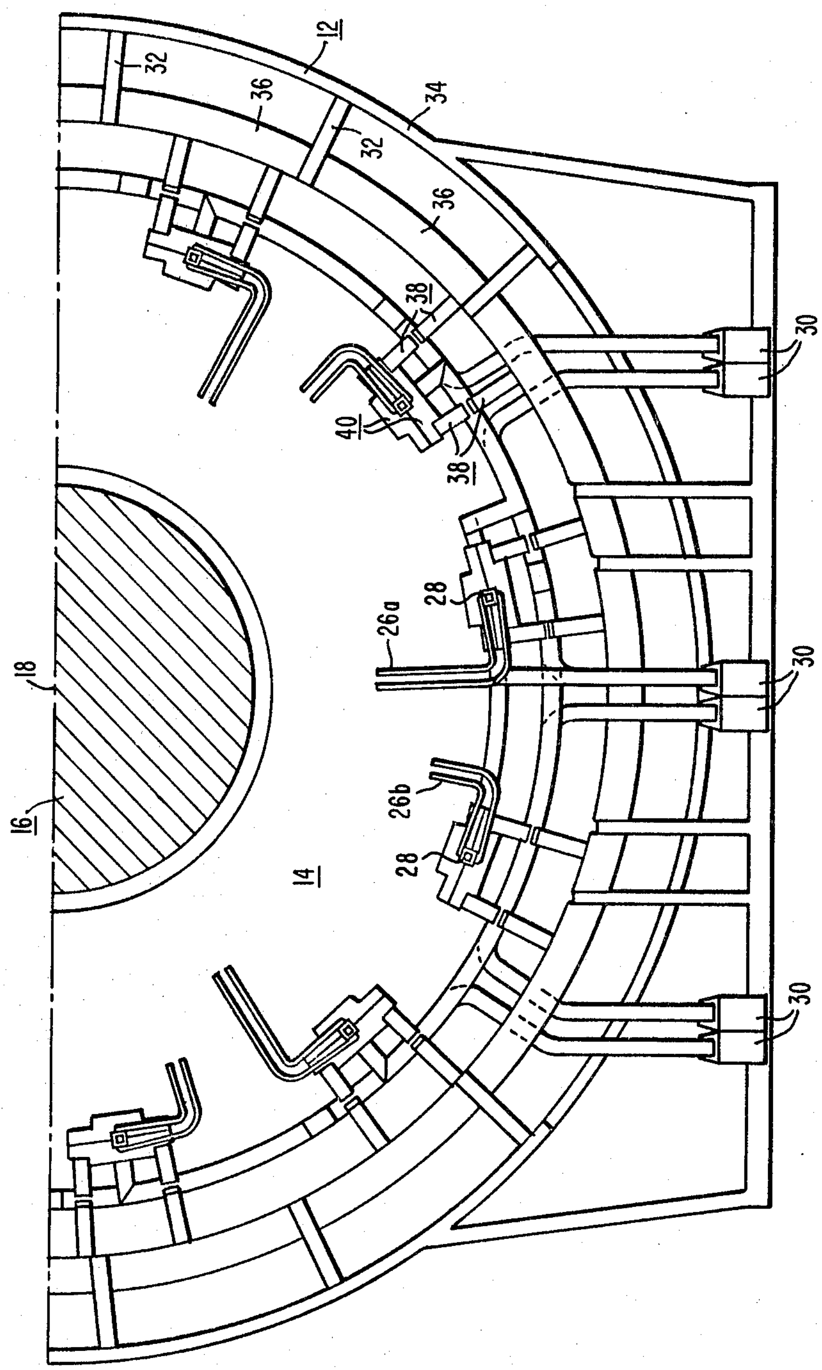
FIG. 2 is a partial sectional view taken along line II—II of the generator of FIG. 1.

FIG. 2 is a partial axial sectional view of generator 10 illustrated in FIG. 1. The coil terminating portions **20*a* and 22*a* have been omitted from FIG. 2 for the sake of clarity. Arcuately separated axial gussets 32 are connected to the interior surface of thin-walled cylinder 34 and provide increased strength and rigidity therefor. Arcuate structural segments 36 are connected between axial gussets 32. Two axial rows of structural segments 36 provide support for conductor ring clamp systems and ring extension clamp structures 38 and 40**, respectively.

Figure 3:
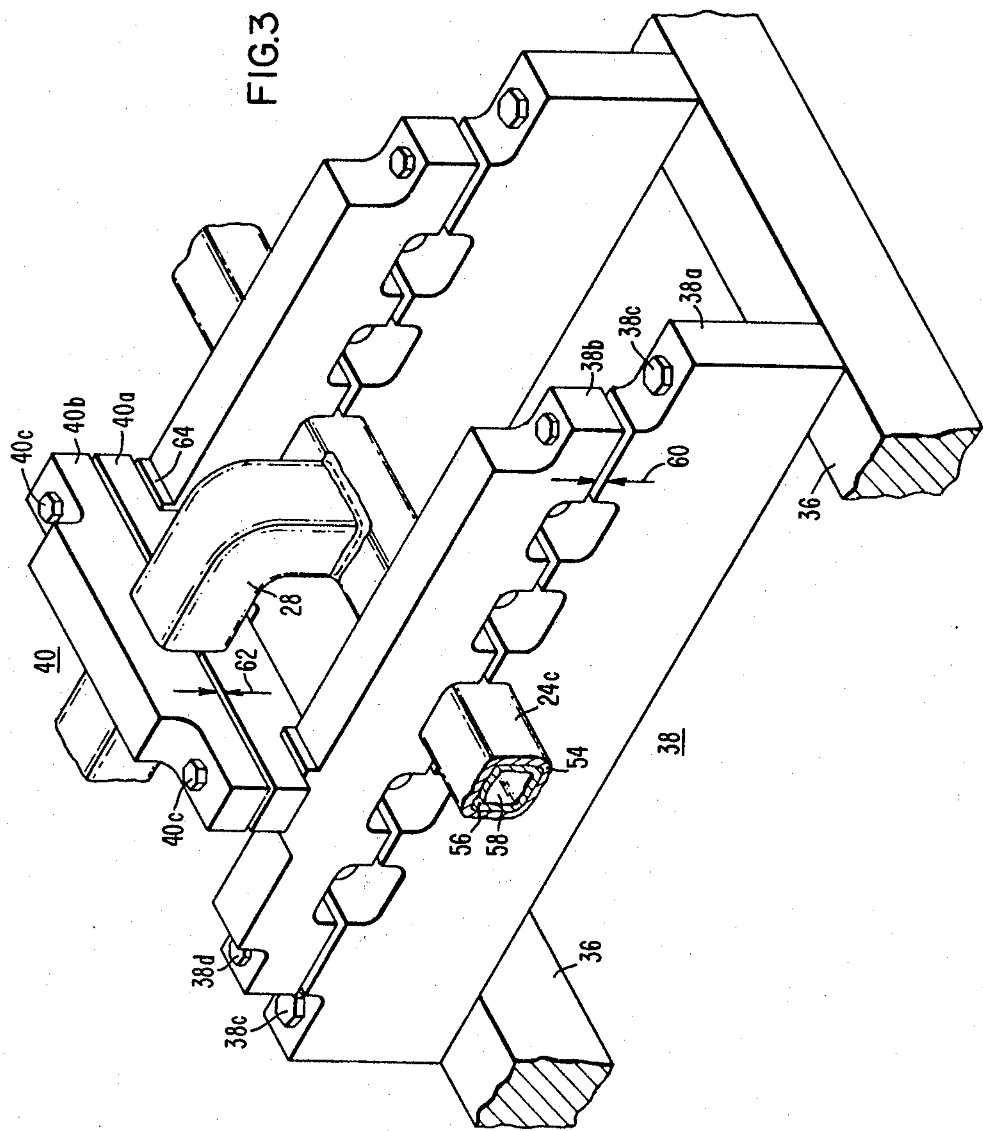
FIG. 3 is an isometric view of the present invention's ring clamping system and associated ring extension clamp structure.

A conductor ring clamp system 38 and associated ring extension clamp structure 40 are best illustrated in FIG. 3. Through the use of arcuate structural segments 36, ring clamp system 38 and associated ring extension clamp structure 40 may be disposed at any circumferential position about stator core 14 so as to permit the use of standardized length phase leads **26*a* and 26*b*. While five conductor ring structures 24 were illustrated in FIGS. 1 and 2, a portion of only one such structure (ring 24c and extension 28) is included in FIG. 3** for the sake of clarity.

Figure 4:
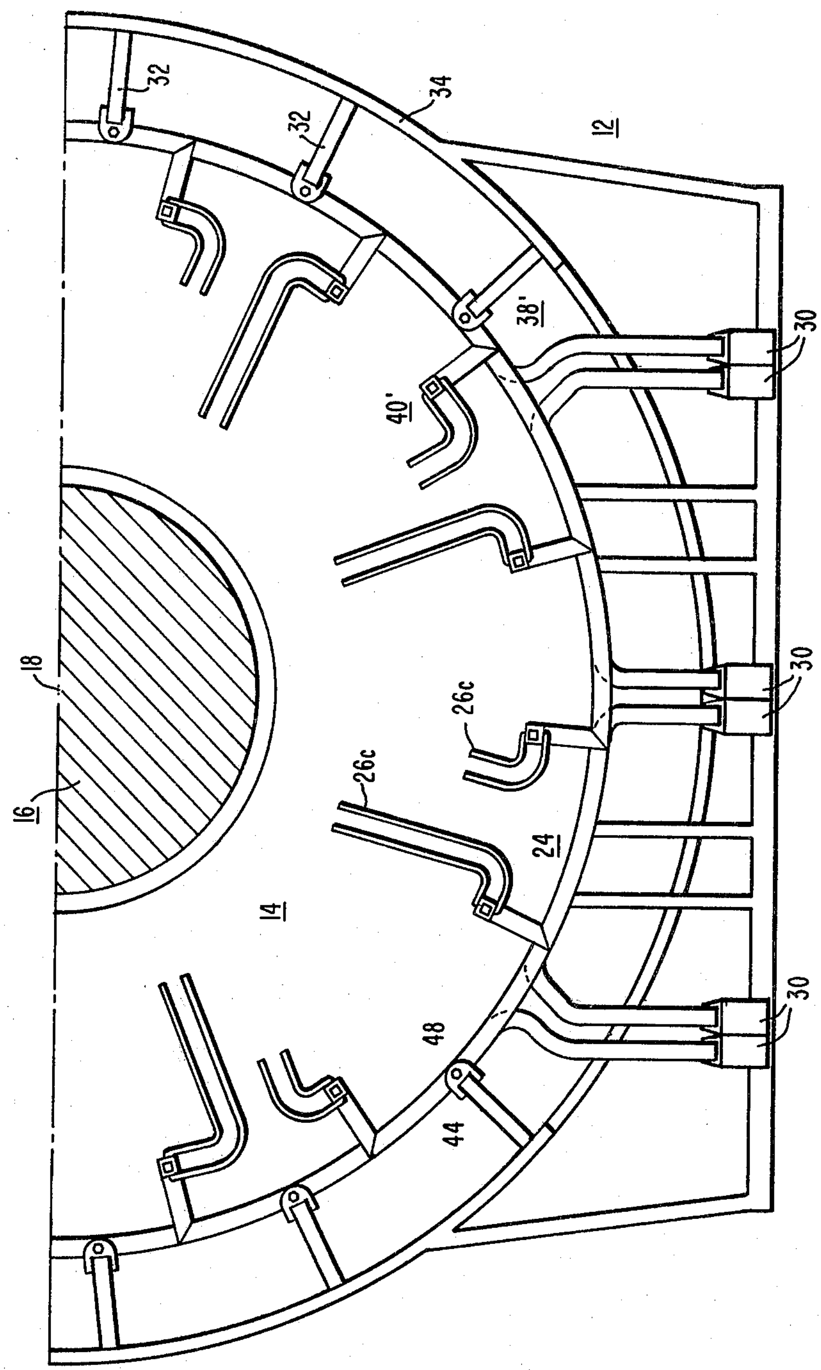
FIG. 4 is a partial, axial sectional view of a prior art turbine generator.

A prior art ring clamp system 38' and associated ring extension clamp structure 40', as illustrated in FIG. 4, were disposed radially within and connected to the axially extending gussets 32. As such, the phase terminals 20b and 22b were arcuately separated by varying amounts from the ring clamp systems and ring extension clamp structures 38' and 40', respectively. Proper connection of the phase terminals 20a and 22a with the appropriate ring extension 28 required the use of phase leads 26c of many different lengths. Use of such varied length phase leads necessitated custom design thereof to ensure phase lead natural frequencies greater than the generator's normal forcing frequency. Such individual design and manufacture of the phase leads was time consuming and costly for their design and manufacture.

Figure 5:
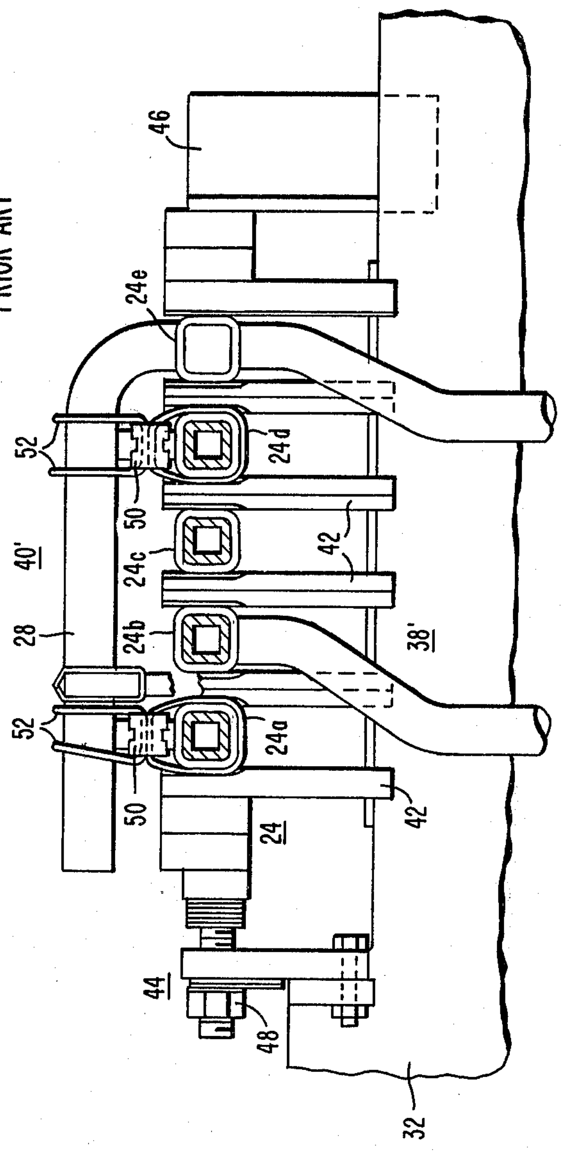
FIG. 5 is an elevation view of a prior art ring clamping system and associated ring extension clamp structure.

As illustrated in FIG. 5, each prior art ring clamp system 38' restrained movement of conductor rings 24a through 24e by imposing axial force only thereon. Stopping structure 46 is disposed on one axial side of conductor rings 24a through 24e and bolt-washer assembly 44 is disposed on the other axial side thereof. Bolt-washer assembly 44 and stopping structure 46 are connected to the same axial gusset 32. Axial compression and retention of conductor rings 24a through 24e obtained from suitably rotating bolt 48 and causing it to advance toward stopping structure 46. The application of axial restraining force on the conductor rings by the prior art clamp system 38' did not, however, positively restrain radial movement of the conductor rings and thus enabled abrasion of the spacers 42 and the conductor rings' insulation. The ring extension clamp structure 38' included radial spacers 50 disposed between ring extension 28 and at least one of the conductor rings (here illustrated between conductor rings 24a and ring extension 28 and also between conductor ring 24d and ring extension 28). Lashing twine 52 secured around the separated conductor rings and ring extension and through the spacers 50 prevented relative movement between ring extension 28 and the secured-to-conductor rings. However, since the conductor rings 24a through 24e were radially restrained only by frictional forces, each ring extension 28 was also radially restrained only by the frictional forces. Additionally, since the conductor ring clamping systems 38' were disposed on the axial gussets 32, the circumferential separation between the ring extensions 28 and the phase terminals (20b and 22b) varied. This variation necessitated use of custom-made phase leads of several different lengths on each generator 10.

The present invention's conductor ring clamp systems 38 and a ring extension clamping structure 40 are illustrated in FIG. 3. Only a selected length of one conductor ring, 24c, is illustrated in the restrained position. The remaining conductor rings illustrated in FIGS. 1 and 2 have been deleted from FIG. 3 for reasons of simplicity and clarity. Each conductor ring clamp system 38 includes an insulated support block 38a which preferably constitutes epoxy glass, an insulated clamping block 38b which also preferably constitutes epoxy glass, means for attaching support block 38a to the casing structure, and means for displacing the clamping block 38b relative to the support block 38a. The preferable means for attaching the support block 38a to the casing structure 12 constitutes bolts 38c which extend through the support block 38a and into threaded engagement with arcuate structural segments 36 preferably disposed along each axial end of support block 38a. The preferable means for attaching clamping block 38b to support block 38a includes bolts 38c which extend through clamping block 38b and into threaded engagement with support block 38a. Each of the conductor rings such as the illustrated ring 24c includes an outer slip layer preferably comprising tetrafluoroethylene to permit expansion of the rings relative to the clamping system. Opening 58 is provided in each conductor 56 for the purpose of internally cooling the conductor ring while slip layer 54 surrounds and insulates each electrical conductor 56.

Each conductor ring extension 28 is at least partially circumferentially bounded by conductor ring clamp systems 38 on either circumferential side thereof. Such configuration is illustrated in FIG. 3 where the conductor ring extension 28 exits from conductor ring 24c between the circumferentially adjacent conductor ring clamp systems 38. However, as illustrated in FIG. 2, the ring extension 28 may exit from a parallel conductor ring on either side of the illustrated, cooperating pair of clamp systems 38. In either case, however, conductor ring extension 28 will extend through a ring extension clamp structure 40 which extends between adjacent, cooperating ring clamp systems 38. The ring extension clamp structure 40 includes a bolster block 40a, retaining block 40b, means for attaching the bolster block 40a to both cooperating clamping blocks 38b, and means for displacing the retaining block 40b relative to the bolster block 40a to provide compression of ring extension 28. The attaching and displacing means preferably constitute bolts 40c which extend through retaining block 40b, bolster block 40a, and into threaded engagement with both clamping blocks 38b of cooperating clamp systems 38. A dimethyl terephthalate-ethylene glycol pad (not shown) impregnated with epoxy resin is preferably used to form a conformable layer between clamp structure 40 and ring extension 28.

Support blocks 38a and clamping blocks 38b each have a plurality (in this case five) of indentations formed in one edge which cooperate, when juxtaposed, to form openings therebetween suitable for clamping and retaining conductor rings disposed therein. The size of the resulting openings are smaller in the radial direction than are the conductor rings with portions of each ring being received in the cooperating, juxtaposed indentations. As such, the support and clamping blocks 38a and 38b, respectively when assembled together about the conductor rings 24a through 24e, are separated in the radial direction by the illustrated distance 60. The desired retaining force for conductor rings 24a through 24e is provided by suitably torquing bolts 38d on either axial end of clamping blocks 38b. Bolster and retaining blocks 40a and 40b, respectively, likewise have at least one indentation formed in one edge of each. The indentations, when juxtaposed, cooperate to form an opening smaller in the radial direction than is the ring extension 28. The resulting radial gap 62 obtains and the desired retention force on ring extension 28 results from suitably torquing bolts 40c into the adjacent, cooperating clamping blocks 38b. Securing bolts 38c, 38d, and 40c comprise non-magnetic bolts preferably made from stainless steel or silicone bronze material.

Ring extensions 28 which extend from conductor rings disposed toward the right side of the support blocks 38a sometimes require the use of a second cooperating ring extension clamp structure 40 which can be mounted anywhere axially to the right of the one illustrated in FIG. 3. The preferable point of mounting is, however, on the radially protruding bosses 64 disposed on each clamping block 38*b*. Such additional ring extension clamp structures provide additional support therefor when needed. Additionally, in the case of four-pole generators, space considerations may dictate the use of multiple cooperating indentations in each bolster block 40*a* and retaining block 40*b* to simultaneously secure two ring extensions 28. In such case, of course, cooperating ring clamp systems 38 must be suitably separated to provide for the additional circumferential expanse required by the additional, ring extension 28.

It will now be apparent that improved parallel conductor ring clamp systems, ring extension clamp structures, and associated support structures have been provided in which both positive axial and radial restraint is utilized to secure the parallel conductor rings and their extensions. The new support structure (arcuate structural segments 36) allows ring clamp systems 38 and extension clamp structures 40 to be located at any circumferential position so as to permit the use of standardized length phase leads for connecting the ring extensions 28 to the phase terminals. As such, the reliability and assembly of the utilizing dynamoelectric machine is improved and corresponding cost decreases are realized.

We claim:

1. A dynamoelectric machine comprising:

a cylindrical stator core;

a stator winding distributed on said core, said winding having a plurality of phase terminals disposed on at least one axial end of said stator core at a plurality of discrete radial distances from said stator core's axis;

a casing structure surrounding said stator core;

a plurality of conductor ring structures having conductor rings of predetermined arcuate length disposed about said stator core at one axial end of said stator core and ring extensions radially and axially extending from said conductor rings;

a plurality of phase lead groups, said groups each including a plurality of phase leads for electrically connecting said terminals and said ring extensions, said phase leads of each group being equal in length, said number of groups being equal to the number of discrete radial terminal distances;

a plurality of conductor ring clamp systems for supporting said conductor rings at selected circumferential locations, said conductor ring clamp systems being connectable to said casing structure; and a plurality of ring extension clamp structures for supporting said ring extensions, said ring extension clamp structures being connectable to said conductor ring clamp systems.

2. The dynamoelectric machine of claim 1, said conductor ring clamp systems comprising:

a plurality of arcuately separated insulated support blocks, said support blocks each having a plurality of indentations in one edge for receiving portions of said conductor rings;

means for attaching said support blocks to said casing structure;

a plurality of insulated clamping blocks each having a plurality of indentations in one edge for receiving portions of said conductor rings, said clamping blocks' indentations being juxtaposable with said support blocks' indentations to form openings for the reception and retention of said conductor rings, said support blocks and clamping blocks being separated when said conductor rings are disposed in said openings; and means for relatively displacing the indented edges of said clamping blocks and said support blocks, said displacing means providing compression of said conductor rings, each of which is partially disposed in one of said clamping block's indentations and one of said support block's indentations.

3. The dynamoelectric machine of claim 2, each of said ring extension clamp structures comprising:

at least one insulated bolster block having at least one indentation at one edge thereof for receiving a first portion of at least a first ring extension, said bolster block extending between selected circumferentially adjacent clamping blocks;

means for attaching said bolster blocks to said selected clamping blocks;

at least one insulated retaining block having at least one indentation in one edge thereof for receiving a second portion of said first ring extension, said retaining block's indentation being juxtaposable with said bolster block's indentation to form an opening for the reception and retention of said first ring extension, said bolster block and retaining block being separated when said first ring extension is disposed in said opening; and means for relatively displacing the indented edge of said retaining block and the intended edge of said bolster block to provide compression of said ring extension partially disposed in said bolster block indentation and partially disposed in said retaining block indentation.

4. The dynamoelectric machine of claim 3, said bolster block attaching means and said retaining block displacing means comprising:

a plurality of non-magnetic bolts extending through said retaining blocks, bolster blocks and into threaded engagement with said clamping blocks.

5. The dynamoelectric machine of claim 2, said support block attaching means comprising:

a plurality of non-magnetic bolts extending through said support blocks and into threaded engagement with said casing structure.

6. The dynamoelectric machine of claim 2, said displacing means comprising:

a plurality of non-magnetic bolts extending through said clamping blocks and into threaded engagement with said support blocks.

7. The dynamoelectric machine of claim 1, said casing structure comprising:

a thin-walled cylinder;

a plurality of axially extending gussets connected to the interior of said cylinder at selected circumferential locations for strenghthening the cylinder; and a plurality of arcuate structural segments connected to said axially extending gussets, said structural segments being disposed in at least two axial rows, said structural segment rows being engageable with said ring clamp systems.

* * * * *